United States Patent [19]

Burckhardt

[11] Patent Number: 4,706,459
[45] Date of Patent: Nov. 17, 1987

[54] COOLED HYDRAULIC HIGH-PERFORMANCE BRAKE SYSTEM FOR MOTOR VEHICLES

[75] Inventor: Manfred Burckhardt, Waiblingen, Fed. Rep. of Germany

[73] Assignee: Daimler-Benz Aktiengesellschaft, Stuttgart, Fed. Rep. of Germany

[21] Appl. No.: 658,035

[22] Filed: Oct. 5, 1984

[30] Foreign Application Priority Data

Oct. 5, 1983 [DE] Fed. Rep. of Germany ....... 3336114

[51] Int. Cl.⁴ .................... B60T 11/20; B60T 5/00; F16D 65/78
[52] U.S. Cl. .................................... 60/562; 60/545; 60/589; 60/456; 188/264 F
[58] Field of Search .............. 60/456, 545, 553, 562, 60/578, 589, 581; 92/174; 188/264 F

[56] References Cited

U.S. PATENT DOCUMENTS

| 2,879,867 | 3/1959 | Rike | 188/264 F X |
|---|---|---|---|
| 2,946,412 | 7/1960 | Jensen | 188/264 F X |
| 2,954,854 | 10/1960 | Eaton et al. | 188/264 F X |
| 3,188,796 | 6/1965 | French et al. | 60/553 X |
| 3,425,574 | 2/1969 | Willgrubs et al. | 60/456 X |
| 3,482,659 | 12/1969 | Knapp et al. | 188/264 F X |
| 3,800,538 | 4/1974 | Jones | 60/581 X |
| 3,928,970 | 12/1975 | Farr | 60/562 |
| 4,091,619 | 5/1978 | Carre et al. | 60/553 |
| 4,285,198 | 8/1981 | Budecker | 60/562 X |
| 4,422,293 | 12/1983 | Ewald | 60/553 X |

FOREIGN PATENT DOCUMENTS

| 733001 | 4/1966 | Canada | 60/548 |
|---|---|---|---|
| 57855 | 8/1982 | European Pat. Off. | 60/589 |
| 3143267 | 6/1983 | Fed. Rep. of Germany | 60/456 |

Primary Examiner—Robert E. Garrett
Assistant Examiner—George Kapsalas
Attorney, Agent, or Firm—Barnes & Thornburg

[57] ABSTRACT

In a hydraulic dual-circuit brake system for motor vehicles, especially high-powered heavy passenger cars, in which the front wheel brakes combined in a front-axle brake circuit are exposed to higher thermal loads than the rearward brakes, brake fluid is conveyed by means of a feed pump to the outlet-pressure space for cooling the front wheel brakes following a braking phase. Circulated brake fluid flows from the master cylinder outlet pressure space assigned to the front-axle circuit, to the wheel brake cylinders, to an additional functional space of the primary piston in the master cylinder, and back to the supply vessel. The circulating fluid pump is controlled by a timing relay which is tripped by the brake-light switch and remains energized for a predetermined time interval to allow sufficient cooling by fluid circulation.

7 Claims, 4 Drawing Figures

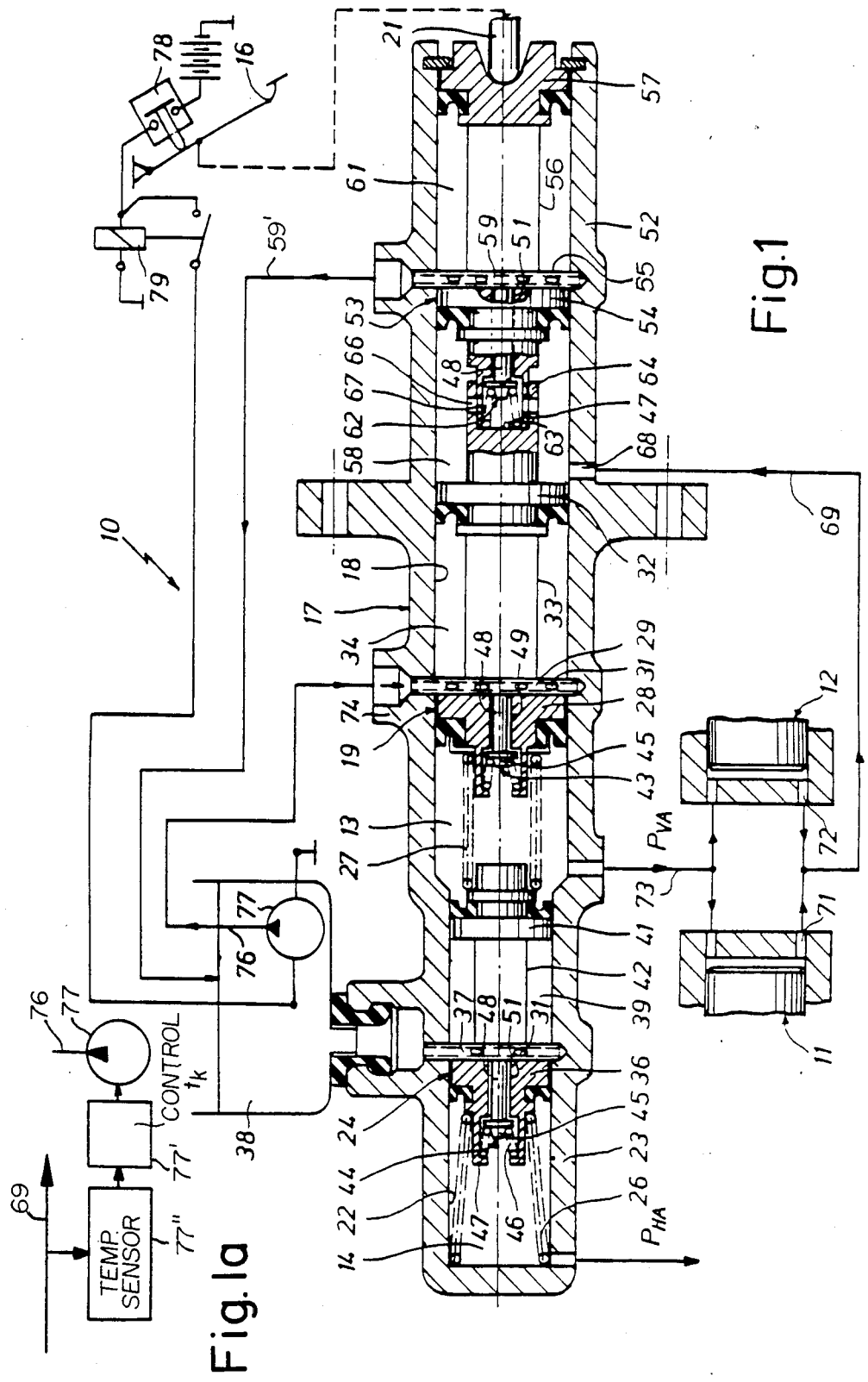

COOLED HYDRAULIC HIGH-PERFORMANCE BRAKE SYSTEM FOR MOTOR VEHICLES

BACKGROUND OF THE INVENTION

1. Field of the Invention

The invention relates to a hydraulic high-performance brake system for motor vehicles, especially passenger cars, with two brake circuits, in one of which, as a rule the front-axle brake circuit, the wheel brakes are exposed to a higher thermal load than in the other brake circuit, with a pump which, when activated, can produce, temporarily, at least in an interval of time following a braking operation, a stream of brake fluid which travels from the supply vessel to a tandem main cylinder, from this to the wheel-brake cylinders of the brakes subjected to a higher thermal load, and from these via the tandem main cylinder back again to the supply vessel, and which eliminates from the wheel-brake cylinders brake fluid heated during a braking phase and conveys cooler brake fluid into the wheel-brake cylinders from the supply vessel.

2. Description of the Prior Art

A brake system of this type is known from German Offenlegungsschrift No. 3,143,267.

The known brake system is designed specially for racing vehicles in which both the front-wheel brakes and the rear-wheel brakes are exposed to considerable thermal loads. It comprises two tandem main cylinders which can be actuated together and which are connected in parallel as regards the braking function and in series as regards the guidance of the brake-fluid circulation produced for the purpose of brake cooling. In the basic position of the two tandem main cylinders, the stream of brake fluid cooling the front-wheel brakes flows from the pressure outlet of the feed pump, via the front-axle outlet-pressure space of the first tandem main cylinder, to the front-wheel brakes, from these to the front-axle outlet-pressure space of the second tandem main cylinder, and from this back to the supply vessel. Correspondingly, the stream of brake fluid cooling the rear-wheel brakes flows from the pressure outlet of the pump, via the outlet-pressure space assigned to the rear-axle brake circuit and belonging to one tandem main cylinder, to the rear-wheel brakes, and from these back to the outlet-pressure space assigned to the rear-axle brake circuit and belonging to the second tandem main cylinder, and from this back again to the supply vessel. Thus, in the known brake system, both the front-wheel and rear-wheel brakes of the vehicle are cooled as required in parallel flow paths of the stream of brake fluid.

SUMMARY OF THE INVENTION

Since, in passenger cars of a high performance and comfort class, the wheel brakes, especially the front-wheel brake, are exposed to high thermal loads similar to those of racing vehicles because of the relatively high vehicle speeds which can be achieved, on the one hand, and the higher vehicle weight in comparison with racing cars, on the other hand, it seems appropriate, in principle, also to equip such passenger cars with brake systems of the known type. However, the technical outlay required for this and the associated extra costs would be considerable. In addition, the accommodation of two tandem main cylinders and a linkage, necessary for their joint actuation, in the engine space, which in a large-series vehicle of conventional design is utilized for receiving numerous additional units essential for driving comfort, would also present considerable problems as regards space, which, at least for some vehicle types, would have to involve a comprehensive change in the arrangement of such additional units in the engine space, this again being associated with additional costs.

Admittedly, because the thermal load on the rear-wheel brakes of conventional road vehicles is distinctly lower in comparison with racing vehicles, it would be possible in such road vehicles to do without a cooling of the rear-axle brake circuit and to that extent achieve a constructional simplification because of the omission of the return lines leading back from the rear-wheel brakes to the rear-axle outlet-pressure spaces of the two tandem main cylinders, but this would not have any notable effect in lessening the technical outlay and outlay in terms of cost or in reducing the space requirement.

The object of the invention is, therefore, to provide a high-performance brake system of the type mentioned in the introduction, which, while still ensuring cooling, as required, of the wheel brakes subjected to high thermal load during braking, has a substantially simpler design and requires considerably less constructional space.

This object is achieved, according to the invention, by means of an hydraulic high-performance brake system with two brake circuits, in one of which, as a rule the front-axle brake circuit, the wheel brakes are exposed to a higher thermal load than in the other brake circuit, with a pump which, as a result of being activated, can produce temporarily, that is to say at least in an interval of time following a braking operation, a stream of brake fluid which travels from a supply vessel to a tandem main cylinder, from the latter to wheel-brake cylinders of the brakes subjected to a higher thermal load, and from these, via the tandem main cylinder, back again to the supply vessel, and which eliminates from wheel-brake cylinders brake fluid heated during a braking phase and conveys cooler brake fluid into the wheel-brake cylinders from the supply vessel, wherein only one tandem main cylinder is provided for generating the brake pressure, and the brake-fluid circulation produced for cooling purposes is guided via a flow path in which the outlet-pressure space, assigned to brakes of the brake circuit subjected to a higher thermal load, of the tandem main cylinder, the wheel brakes to be cooled, and a further functional space of the tandem main cylinder are connected in series, and which, in the basic position of the pistons of the tandem main cylinder, is connected both to the wheel-brake cylinders and to the supply vessel or the pump and is otherwise shut off from the supply vessel or from the wheel-brake cylinders.

According to this, only one tandem main cylinder is provided for generating the brake pressure, and a cooling stream of brake fluid, which only flows through the wheel-brake cylinders of the brake circuit subjected to a higher thermal load, is guided via a flow path in which the outlet-pressure space, assigned to the brakes of the brake circuit subjected to a higher thermal load, of the tandem main cylinder, the wheel brakes to be cooled, and a further functional space of the tandem main cylinder are connected in series in this sequence, and, in the basic position of the pistons of the tandem main cylinder, this further functional space is connected both to the wheel brakes and to the supply vessel or the pump and is otherwise shut off from the supply vessel or from the wheel-brake cylinders.

In comparison with the known brake system, the technical outlay necessary for cooling the vehicle brakes as required is reduced considerably. In comparison with a conventional brake system, that is to say one which works without a cooling stream of brake fluid, the extra outlay, which is necessary to produce the brake system according to the invention and which results essentially from the installation of a small feed pump and a pressure line leading back from the wheel-brake cylinders of the cooled brake circuit to the tandem main cylinder, is only slight and is amply justified by the gain in safety which can be achieved.

According to another object of the invention, in the basic position of a tandem main cylinder, its outlet-pressure space intended for a brake circuit subjected to a higher thermal load is connected in series, via the wheel-brake cylinders to a follow-up space of the piston provided for the other brake circuit.

Another object of the invention is provision of a brake system which operates with alternative directions of flow of the cooling stream of the brake fluid wherein the brake fluid circulation is guided from a pump and the outlet-pressure space of a tandem main cylinder to wheel-brake cylinders, from these to a follow-up space of a second brake circuit, and from this follow-up space back to a supply vessel.

Another object of this invention is provision of a brake system wherein a stream of brake fluid is guided from a pump first to a follow-up space of that brake circuit which is not to be cooled, from this follow-up space to plural wheel-brake cylinders of the brake circuit to be cooled, and from these back to an outlet-pressure space of a tandem main cylinder which is assigned to the brake circuit to be cooled.

In combination with the guidance of the cooling stream of brake fluid, provided in a brake system according to the above objects, according to another object of the invention between a pump and a follow-up space of an uncooled brake circuit a non-return valve is inserted which is biased in the opening direction as a result of the high outlet pressure of the pump and is a closing direction as a result of the brake pressure inthe brake circuit to be cooled. These features make it impossible for any noteworthy lengthening of the pedal travel, when the brake system is actuated, to occur as a result of the communication connection which exists in the basic position of the main cylinder pistons, via the wheel-brake cylinders, between the functional spaces of the tandem main cylinder through which passes the stream of brake fluid.

Another object of the invention is the provision of a high performance brake circuit wherein it is possible to achieve a favorably high flow cross-section for the cooling stream of brake fluid and nevertheless prevent a wear-promoting load on the sealing gaskets of the pistons of the tandem main cylinder. In a similar way, in a tandem main cylinder operating on the blowhole principle, the effective cross-section of the compensating channel, via which a stream of brake fluid utilized for brake cooling flows into the outlet-pressure space of the tandem main cylinder, can also be made favorably large. In such a system a brake fluid line connecting a follow-up space of a secondary piston to wheel-brake cylinders is connected to a collecting channel or space a cylinder housing, from which extend several bores of small cross-section, which, in the basic position of the secondary piston open into the follow-up space immediately next to a separating flange of the said secondary piston.

It is another object of the invention to provide a brake system having additional flanges of a primary piston limit an additional functional space which, as seen in the axial direction, is located between a follow-up space, limited by a thrust flange and one additional flange of a primary piston, and a second follow-up space of a tandem main cylinder, limited by an end flange and the second additional flange of the primary piston, and, in the basic position of the primary piston, communicates with a supply vessel, on the one hand, and wheel-brake cylinders to be cooled, on the other hand, and is otherwise shut off from the supply vessel, and in that the stream of brake fluid is guided back from the pump to the first follow-up space or directly into primary outlet-pressure space of the tandem main cylinder, from this to wheel-brake cylinders, and from these back via a return line into the additional functional space of the tandem main cylinder, thereby preventing a lengthening of the pedal travel. Although a slightly extended design of the tandem main cylinder has to be taken into account, there is no need for an additional non-return valve.

According to another object of the invention, in a preferred design, the brake system is also produced by means of the features which make it possible to achieve favorably large flow cross-sections for the cooling stream of brake fluid and nevertheless reliably prevent wear-promoting loads on the sealing and separating gaskets of the pistons of the tandem main cylinder, wherein at least a primary outlet-pressure space and preferably also a secondary outlet-pressure space of a tandem main cylinder is or are connected, via a central valve located on a thrust flange of a primary piston, or via a central valve located on a thrust flange of a secondary piston, these central valves being open in the basic position of the pistons of the tandem main cylinder and being shut off after a small fraction of the possible piston strokes, to the follow-up space of the primary piston or to the follow-up space, communicating with a supply vessel, of the secondary circuit of the tandem main cylinder.

According to an object of the invention a primary piston may be provided with a central valve which is located on a second additional piston flange referred to above, shutting off the additional functional space from the second follow-up space, and, in the basic position of the primary piston, this central valve is open, and the further functional space connected to the wheel-brake cylinders via the return line communicates with the second follow-up space.

By another object of the invention, the second additional piston flange of the primary piston is designed as an end-face flange of a primary-piston part which is supported, by means of the supporting prolongation, containing the central valve, of the end flange, on a pot-shaped extension, of matching shape, of the intermediate piston of the other piston part of the primary piston, this supporting prolongation of the central valve and the shell of the pot-shaped extension being provided with orifices which are aligned with one another and via which the further functional space communicates with the valve channel of the central valve in the open position of the latter.

These and other objects, features and advantages of the present invention will become more apparent from the following description when taken in connection with the accompanying drawings which show, for the purposes of illustration only, plural embodiments in accordance with the present invention, and wherein:

BRIEF DESCRIPTION OF THE DRAWINGS

FIG. 1 shows a preferred exemplary embodiment of a brake system according to the invention, in a simplified, diagrammatic and partially truncated sectional representation on the scale 1:1, FIG. 1a shows a brake fluid temperature sensor according to the invention, and FIGS. 2 and 3 show further alternative embodiments of brake systems according to the invention, in a representation which is further simplified, but otherwise corresponds to that of FIG. 1.

DETAILED DESCRIPTION OF THE INVENTION

Turning now to the drawings wherein like reference numerals represent like features, and in particular to FIG. 1, there is shown a brake system 10 according to the invention, belonging to a passenger car. It is assumed that, as is usually the case, the front-wheel brakes which are each represented by a wheel-brake cylinder 11 and 12 and which are combined to a front-axle brake circuit are exposed, during a braking operation, to substantially higher thermal loads than the rear-wheel brakes (not shown) combined into the second brake circuit of the vehicle.

The front-wheel brakes 11 and 12 are connected to the primary outlet-pressure space 13 and the rear-wheel brake to the secondary outlet-pressure space 14 of a tandem main cylinder 17 which can be actuated by means of the brake pedal 16 and which, in the exemplary embodiment illustrated, is designed as a stepped cylinder, of which the bore step 18, in which the primary piston denoted as a whole by 19, on which the thrust rod 21 connected to the brake pedal 16 engages, has a somewhat larger cross-section than the bore step 22 of the cylinder housing 23, in which is arranged displaceably the secondary piston of the tandem main cylinder 17, designed as a floating piston and designated as a whole by 24. Restoring springs which are provided in a conventional arrangement and which urge the secondary piston 24 and the primary piston 19 into their illustrated basic position are designated by 26 and 27 respectively. The basic position of the primary piston 19 is marked when its thrust flange 28, limiting the primary outlet-pressure space 13 on one side, comes rearwardly up against a follow-up tube 29 which is inserted into the cylinder housing 23 in the arrangement illustrated and which is provided with orifices 31 via which brake fluid can flow into the follow-up space 34, which is limited by the thrust flange 28 and an intermediate flange 32 which is connected to the thrust flange 28 by means of a slotted piston rod 33 through which the follow-up tube 29 passes radially. Likewise, the basic position of the secondary piston 24 is marked when its thrust flange 36, limiting the rear-axle outlet-pressure space 14, comes rearwardly up against an appropriately arranged follow-up tube 37, via orifices 31 of which brake fluid can flow out of the supply vessel 38 into the follow-up space 39, which is limited in the axial direction by the thrust flange 36 and the separating flange 41 of the secondary piston 24, the two piston flanges 36 and 41 of the secondary piston 24 again being connected to one another by a slotted piston rod 42 through which the follow-up tube 37 passes radially. The thrust flanges 28 and 36 of the primary piston 19 and of the secondary piston 24 are provided with central valves 43 and 44, which are designed as seat valves and the valve bodies 45 of which are urged into their closing position, that is to say up against the particular valve seat located on the piston side, by means of compression springs 46 which are supported on radial inner flanges of sleeve-shaped supporting prolongations 47, each open towards the particular outlet-pressure space 13, 14, of the thrust flanges 28 and 36 of the primary piston 19 and of the secondary piston 24 respectively. The valve bodies 45 of the central valves 43 and 44 each have an axial spacer bolt 48 which passes through an axial bore 49, 51 of the thrust flange 28, 36 of the primary piston 19 and of the secondary piston 24 respectively, and, in the basic position of the cylinder pistons 19 and 24 as illustrated, the valve bodies 45 of the central valves 43 and 44 are retained, because their spacer bolts 48 are supported on the follow-up tubes 29 and 37, in their position lifted off from the valve seat, in which the follow-up spaces 34 and 39 communicate with the outlet-pressure spaces 13 and 14 of the tandem main cylinder which are assigned to the two brake circuits.

The design of the tandem main cylinder 17 explained so far corresponds to that of known tandem main cylinders, in which the thrust rod would engage directly on an end flange provided instead of the intermediate flange 32 of the primary piston 19.

In contrast according to the invention, the housing 23 of the tandem main cylinder 17 provided within the scope of the brake system 10 has a lengthening piece 52 which is located on the same side as the thrust rod and in which is arranged an auxiliary piston 53 forming part of the primary piston 19 and possessing an end-face flange 54 and an end flange 57 which is again connected to the latter by a slotted piston rod 56 and on which engages the thrust rod 21 coupled to the brake pedal. An additional functional space 58 is limited in the axial direction by the end-face flange 54 of this auxiliary piston 53 and the intermediate flange 32 of the primary piston 19 on the other hand, and an additional follow-up space 61, again communicating via a follow-up tube 59 with the supply vessel 38 and located in the tandem main cylinder 17, is limited by the end-face flange 55 and the end flange 57 of the auxiliary piston 53 on the other hand.

The end-face flange 54 of the auxiliary piston 53 is, again, provided with a central valve 62 which corresponds in terms of construction to the above-explained central valves 43 and 44 and which, in the basic position of the auxiliary piston 53 or of the primary piston 19 as illustrated, is retained, because its spacer bolt 48 is supported on the follow-up tube 59, in its open position in which the additional functional space 58 is connected so as to communicate with the additional follow-up space 61 or the supply vessel 38. In the exemplary embodiment illustrated, the auxiliary piston 53 is supported, by means of the annular end face of its sleeve-shaped supporting prolongation 47, on the bottom 63 of a pot-shaped extension 64 of the intermediate flange 32 of the primary piston 19, this pot-shaped extension 64 and the sleeve-shaped supporting prolongation 47 of the central valve 62 being provided with radial bores 66 and 67 which are aligned with one another and which, in the open position of the central valve 62, make the communicating connection between the central valve channel 51 and the additional functional space 58.

The housing 23, 52 of the tandem main cylinder 17 is provided with an inlet bore 68 which opens into the additional functional space 58 and to which is connected a pressure-tight return line 69 which itself is connected to return channels 71 and 72 of the wheel-brake cylinders 11 and 12 of the front-axle brake circuit, these being jointly subjected to pressure via the brake line 73 connected to the primary outlet-pressure space 13 of the tandem main cylinder 17.

The pressure outlet 76 of an electrically controllable feed pump 77 is connected to the connection piece 74 which, in the basic position of the primary piston 19 as illustrated, communicates via line 74 with the primary outlet-pressure space 13 of the tandem main cylinder, and this feed pump, when activated, can, in the basic position of the primary piston 19, produce a stream of brake fluid which flows via the central valve 43 of the thrust flange 28 of the primary piston 19 through the primary outlet-pressure space 13 to the wheel-brake cylinders 11 and 12, from these via the return line 69 to the further functional space 58, and from this via the central valve 62 and the further follow-up space 61 or the follow-up tube 59 via line 59' back to the supply vessel 38.

As a result of this stream of brake fluid which, after a braking operation, quickly eliminates heated brake fluid in the wheel-brake cylinders 11 and 12 and conveys cooler brake fluid into the wheel-brake cylinders, effective cooling of brakes subjected to thermal load is achieved and their reliability is increased considerably.

In the exemplary embodiment illustrated, the appropriate control of the feed pump 77 is accomplished because, as soon as the brake-light switch 78 is closed, the electrical drive motor of the feed pump is connected via a timing relay 79 to the supply-voltage source, namely the vehicle battery, and, after braking has ended or the brake-light switch 78 is opened again, remains connected to the supply-voltage source via this timing relay 79 for the period of time $\Delta t_k$ within which the stream of brake fluid can effect sufficient cooling of the brakes 11 and 12.

If appropriate, as shown in FIG. 1a, it is also possible to provide a temperature-dependent control of the period of time $\Delta t_k$, in such a way that the stream of brake fluid is maintained until the temperature of the brake fluid flowing off via 69 from the wheel-brake cylinders 11 and 12 falls below a threshold value which can be predetermined. It can be expedient to provide a control 77' of this type, sensing temperature of brake fluid in line 69 by means of temperature sensor 77" in order to keep the operating times of the feed pump as short as possible. The central valves 42 and 62, via which the cooling stream of brake fluid flows, can be produced with favorably large flow cross-sections, so that the feed pump has only a low power requirement and can be designed for a low outlet pressure, this also being advantageous inasmuch as the pressure in the follow-up space 34 ought not to assure excessively high values if the pump 37 is still activated when the brakes are actuated again.

The basic design of two further brake systems 20 and 30 are explained below with reference to FIGS. 2 and 3 respectively, the details of which express reference is made again.

In these brake systems, the wheel brakes 11 and 12 combined in one of the two brake circuits can be cooled by means of a stream of brake fluid, and the tandem main cylinders 87, FIG. 2, and 97 FIG. 3, provided in these designs can be made with a distinctly shorter constructional length than the tandem main cylinder 17 of the brake system 10 according to FIG. 1.

For the sake of simplicity, instead of the central valves 43 and 44 according to FIG. 1, FIGS. 2 and 3 illustrate compensating bores 82 and 83, so-called blow-holes, via which, in the basic positions of the primary pistons 19 and secondary pistons 24 as illustrated, brake fluid can flow into the outlet-pressure spaces 13 and 14 of the tandem main cylinders 87 and 97, of FIGS. 2 and 3 respectively, or can flow off from these.

In the exemplary embodiment according to FIG. 2, the stream of brake fluid is introduced into the tandem main cylinder 87 via the compensating bore 82 assigned to the primary outlet-pressure space 13, and is conveyed, via the pressure outlet of the primary outlet-pressure space 13 assigned to the front-axle brake circuit and via the brake line 73, to the wheel-brake cylinders 11 and 12 and from these via the return line 89, which here opens into the follow-up space 39 of the secondary piston 24, and via the secondary-side follow-up bore 84 of the latter, back into the supply vessel 38. The discharge bore 86, via which the stream of brake fluid conveyed back to the supply vessel 38 flows into the follow-up space 39 limited by the secondary piston 24, is located in the immediate vicinity of the separating flange 41 of the secondary piston 24, so that the hydraulic short-circuit, existing between the primary outlet-pressure space 13 and the secondary-side follow-up space 39 and resulting in an undesirable lengthening of the pedal travel when the brakes are actuated, is cancelled after as short a displacement travel of the secondary piston as possible, and the build-up of brake pressure in the primary outlet-pressure space 13 can start.

The brake system 30 illustrated in FIG. 3 differs from that according to FIG. 2 essentially in that the stream of brake fluid produced for cooling the wheel brakes 11 and 12 flows in the opposite direction, that is to say is guided from the pump 77 via non-return valve 41 to the follow-up bore 84 which opens into the follow-up space 39 limited by the secondary piston 24, from this to the wheel-brake cylinders 11 and 12, and from these back to the primary outlet-pressure space 13 via the brake line 73 and back to the supply vessel 38 via its compensating bore 82.

Furthermore, between the pump 77 and the follow-up bore 84 of the follow-up space 39 located on the secondary side is inserted a non-return valve 91 which is stressed in the opening direction by the outlet pressure of the feed pump 77 and in the closing direction by the brake pressure which builds up when the brakes are actuated both in the primary outlet-pressure space 13 and in the follow-up space 39 located on the secondary side. As a result, the hydraulic short-circuit existing between these functional spaces 13 and 39 of the tandem main cylinder 97, via the wheel-brake cylinders 11 and 12, is cancelled early during braking, so that there is no noteworthy lengthening of the pedal travel.

It goes without saying that, in the tandem main cylinders 87 and 97 according to FIGS. 2 and 3, the clear cross-sections of the compensating bores 82 and of the discharge bores 86 of the cylinder housings have to be made sufficiently large to ensure obtaining the through-put of brake fluid necessary for a sufficient cooling effect.

If appropriate, instead of such a bore 82 and/or 86 with an undesirably large orifice cross-section, several parallel bores with a smaller cross-section must be provided. This difficulty can be overcome, at least in the region of the primary outlet-pressure space 13, if, instead of a compensating bore 82 opening directly into the latter, a primary piston 19 with a central valve 43 is used, as already explained in detail with reference to FIG. 1.

While I have shown and described several embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A cooling apparatus for a motor vehicle hydraulic brake system having at least one wheel brake cylinder, a pump having an output and communicating with a supply vessel having an input, a tandem main cylinder comprising at least a primary piston, a secondary piston, a separating flange disposed between the primary and secondary pistons, a primary outlet pressure space disposed between the primary piston and the separating flange, and a follow-up space disposed between the secondary piston and the separating flange, and wherein an additional functional space is limited by an intermediate flange and an auxiliary piston forming part of the primary piston, and an additional follow-up space of the tandem main cylinder is limited by an end flange and said auxiliary piston forming part of the primary piston, said additional follow-up space communicates with the supply vessel and said additional functional space and said additional follow-up space communicating with said at least one wheel-brake cylinder, and wherein a stream of brake fluid is guided from the pump outlet by a path directly into the primary outlet-pressure space of the tandem main cylinder to the at least one wheel-brake cylinder, and then via a return line into the additional functional space and additional follow-up space of the tandem main cylinder to said supply vessel.

2. A cooling apparatus according to claim 1, wherein the primary outlet-pressure space of the tandem main cylinder is connected between said pump outlet and said supply vessel via means comprising one of an opening and a central valve located on a thrust flange of the primary piston and is connected to said at least one wheel brake cylinder and connected to a follow up space of said primary piston.

3. A cooling appartus according to claim 2, further comprising a secondary outlet pressure space of said secondary piston communicating with said supply vessel via an opening and a central valve of a thrust said secondary piston.

4. A cooling apparatus according to claim 2, wherein the primary piston has an axis and is provided with a second central valve which is located on an auxiliary piston forming part of and coaxially disposed with respect to said primary piston and controlling communication between the additional functional space and the additional follow-up space when the second central valve is in an open position.

5. A cooling apparatus according to claim 4, wherein the auxiliary piston forming part of said primary piston is disposed within said tandem main cylinder by means of a supporting prolongation, the second central valve of the auxiliary piston disposed on a pot-shaped extension of the primary piston, the supporting prolongation containing the second central valve and a shell of the pot-shaped extension being provided with orifices which are aligned with one another and via which the additional functional space communicates with a valve channel of the second central valve in an open position of the second central valve.

6. A cooling apparatus according to claim 1, wherein the primary piston has an axis and is provided with a central valve which is located on said auxiliary piston forming part of and coaxially disposed with respect to said primary piston and controlling communication between the additional functional space and the additional follow-up space when the central valve is in an open position.

7. A cooling apparatus according to claim 6, wherein the auxiliary piston forming part of said primary piston is disposed within said tandem main cylinder by means of a supporting prolongation, and the central valve of the auxiliary piston forming part being disposed in a pot-shaped extension of the primary piston, the supporting prolongation containing the central valve and a shell of the pot-shaped extension being provided with orifices which are aligned with one another and via which the additional functional space communicates with a valve channel of the central valve in an open position of the central valve.

* * * * *